US009627676B2

(12) United States Patent
Oda et al.

(10) Patent No.: US 9,627,676 B2
(45) Date of Patent: Apr. 18, 2017

(54) NEGATIVE ELECTRODE TERMINAL AND COVER MEMBER FOR LITHIUM ION BATTERY, AND LITHIUM ION BATTERY

(71) Applicants: NEOMAX MATERIALS CO., LTD., Suita-shi, Osaka (JP); HITACHI METALS, LTD., Minato-ku, Tokyo (JP)

(72) Inventors: Yoshimitsu Oda, Suita (JP); Masaaki Ishio, Suita (JP); Yasuto Nozawa, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 421 days.

(21) Appl. No.: 14/026,596

(22) Filed: Sep. 13, 2013

(65) Prior Publication Data
US 2014/0011074 A1    Jan. 9, 2014

Related U.S. Application Data

(63) Continuation of application No. PCT/JP2012/058364, filed on Mar. 29, 2012.

(30) Foreign Application Priority Data

Mar. 30, 2011  (JP) ................... 2011-073917

(51) Int. Cl.
H01M 2/30    (2006.01)
H01M 2/06    (2006.01)
(Continued)

(52) U.S. Cl.
CPC .............. *H01M 2/30* (2013.01); *H01M 2/06* (2013.01); *H01M 2/22* (2013.01); *H01M 2/202* (2013.01);
(Continued)

(58) Field of Classification Search
CPC ...... H01M 2/22; H01M 2/263; H01M 10/052; H01M 2/30
See application file for complete search history.

(56) References Cited

U.S. PATENT DOCUMENTS

2001/0049054 A1   12/2001  Enomoto et al.
2005/0100785 A1    5/2005  Enomoto et al.
(Continued)

FOREIGN PATENT DOCUMENTS

JP    11-156995 A    6/1999
JP    2001-357834 A  12/2001
(Continued)

OTHER PUBLICATIONS

International Search Report dated Jun. 19, 2012, issued in corresponding application No. PCT/JP2012/058364.
(Continued)

*Primary Examiner* — Ula C Ruddock
*Assistant Examiner* — Gregory Passa
(74) *Attorney, Agent, or Firm* — Westerman, Hattori, Daniels & Adrian, LLP

(57) ABSTRACT

The present invention relates to a lithium ion battery employed by connecting the positive electrode side to a negative electrode portion made of Cu or a Cu alloy by a bus bar made of Al or an Al alloy and provides a negative electrode terminal for a lithium ion battery capable of providing sufficient bonding strength between the negative electrode portion and the bus bar when the negative electrode portion and the bus bar are metallurgically bonded to each other by resistance welding or the like, for example. This negative electrode terminal for a lithium ion battery is made of a clad material having a first metal layer made of Al or an Al alloy and a second metal layer made of Cu or a Cu (Continued)

alloy bonded to each other through a reaction-suppressing layer suppressing a reaction therebetween.

12 Claims, 7 Drawing Sheets

(51) Int. Cl.
*H01M 2/22* (2006.01)
*H01M 2/20* (2006.01)
*H01M 2/26* (2006.01)
*H01M 10/052* (2010.01)
*H01M 10/0587* (2010.01)

(52) U.S. Cl.
CPC ............ *H01M 2/263* (2013.01); *H01M 2/305* (2013.01); *H01M 10/052* (2013.01); *H01M 10/0587* (2013.01)

(56) References Cited

U.S. PATENT DOCUMENTS

| 2007/0059592 A1* | 3/2007 | Takami | H01M 2/06 429/161 |
|---|---|---|---|
| 2011/0244309 A1 | 10/2011 | Byun et al. | |
| 2012/0058360 A1* | 3/2012 | Oda | B23K 20/02 428/600 |

FOREIGN PATENT DOCUMENTS

| JP | 2002-216716 A | 8/2002 |
| JP | 2007-134233 A | 5/2007 |
| JP | 2010-097769 A | 4/2010 |
| JP | 2010-258003 A | 11/2010 |
| JP | 2011-210725 A | 10/2011 |
| WO | 2010/137353 A1 | 12/2010 |

OTHER PUBLICATIONS

Written Opinion dated Jun. 19, 2012, issued in corresponding application No. PCT/JP2012/058364.

Office Action dated Apr. 3, 2015, issued in corresponding Chinese Patent Application No. 201280013478.7 with English translation (24 pages).

Office Action dated Jan. 5, 2016, issued in counterpart Japanese Application No. 2013-507725, with English ranslation (13 pages).

Office Action dated Jan. 5, 2016, issued in counterpart Japanese Application No. 2013-507725, with English translation (19 pages).

* cited by examiner

NEGATIVE ELECTRODE TERMINAL AND COVER MEMBER FOR LITHIUM ION BATTERY, AND LITHIUM ION BATTERY

CROSS-REFERENCE TO RELATED APPLICATIONS

This application is a continuation of PCT/JP2012/058364, Negative Electrode Terminal and Cover Member for Lithium Ion Battery, and Lithium Ion Battery, Mar. 29, 2012, Yoshimitsu Oda, Masaaki Ishio, and Yasuto Nozawa.

BACKGROUND OF THE INVENTION

Field of the Invention

The present invention relates to a negative electrode terminal for a lithium ion battery, having a plurality of layers of different metal materials bonded to each other, a cover member for a lithium ion battery including the negative electrode terminal, and a lithium ion battery employing the cover member.

Description of the Background Art

In batteries, there are a primary cell, a secondary cell, and a fuel cell, all of which are chemical cells, a solar cell, which is a physical cell, and so on. The primary cell cannot be charged and includes a dry cell such as a manganese cell, a lithium cell, a button cell, etc. The secondary cell can be charged and includes a nickel-cadmium battery, a nickel-hydrogen battery, a lithium ion battery, etc. These various batteries are employed according to purposes. For example, the lithium ion battery has such characteristics that there is no high energy density (energy extracted per unit mass or per unit volume) and little memory effect (a degradation phenomenon in which the capacity appears to be reduced when a secondary cell is recharged before the secondary cell is sufficiently discharged) and is widely employed in a portable device such as a portable telephone or a notebook computer.

In recent years, a large-sized lithium ion battery has been employed in an electric vehicle, a hybrid electric vehicle, a smart grid, etc. In these fields, a plurality of lithium ion batteries may often be electrically connected to each other to be employed in order to obtain a large current. A connection component (bus bar) between terminals made of a Cu-based material having low electrical resistance and generating less Joule heat is employed to connect between terminals of these batteries. Conventionally, the bas bur is often mechanically fastened to the battery terminals by a bolt and a nut or the like in order to be capable of easily replacing the batteries in consideration of variations in the characteristics of the individual batteries.

A recent lithium ion battery is disclosed in Japanese Patent Laying-Open No. 2011-210725 (Patent Document 1), for example. In this battery, Al capable of suppressing a chemical reaction with a positive-electrode active material is employed in a collector of a positive electrode, and Cu having low electrical resistance is employed in a collector of a negative electrode. As materials for terminals provided to be exposed from the battery, materials easily welded to the collectors are selected, and Al is employed for a position electrode portion while Cu is employed for a negative electrode portion. Most materials for individual parts of the lithium ion battery are selected in this manner. Furthermore, the structure of employing Al in a portion of a positive electrode portion (a lower portion of a terminal) connecting with a collector made of Al and containing Cu in a portion of the positive electrode portion (an upper portion of the terminal) connecting with a bus bar in order to reduce resistance (contact resistance) resulting from connection between the positive electrode portion made of Al and the bus bar made of a Cu-based material is disclosed in Japanese Patent Laying-Open No. 2010-097769 (Patent Document 2), for example.

In recent years, the quality of a lithium ion battery has been improved by suppressing variations in electrical characteristics, and it has been considered that welding is applied to connect a bus bar to a battery terminal in order to further reduce the weight, reduce the size (reduce the volume), and improve productivity. In addition, it has been considered that a bus bar made of an Al-based material having a smaller density (specific gravity) and enabling reduction in weight is applied instead of a conventional bus bar made of a Cu-based material. According to the structure disclosed in the aforementioned Patent Document 2, for example, the bus bar made of the Al-based material can be easily welded to the positive electrode portion made of Al.

However, when the bus bar made of the Al-based material and the negative electrode portion made of Cu are welded to each other, a reaction resulting from heat in welding occurs, and an intermetallic compound of Al and Cu having weak mechanical strength is generated on a bonding interface by a gradient of composition. Thus, the bonding strength is reduced. In order to solve this problem, the structure of welding a bus bar made of an Al-based material to a terminal member (negative electrode terminal) made of Al and welding the terminal member to the negative electrode portion made of Cu through a two-layered clad material made of Al and Cu is proposed in the aforementioned Patent Document 1, for example.

According to the aforementioned Patent Document 1, the two-layered clad material made of Al and Cu is applied. However, although sufficient bonding strength is previously provided to the clad material, the clad material is an assembly of an Al-based material and a Cu-based material. Therefore, when the heat input in welding is increased and heat of about 500° C. is transferred, there is such a problem that the aforementioned reaction occurs on a bonding interface between an Al layer and a Cu layer of the clad material to generate an intermetallic compound and the bonding strength is reduced. In addition, two components of the terminal member (negative electrode terminal) and the clad material are required to connect the bus bar to the negative electrode portion, and hence there are such a problem that production efficiency is reduced, such a problem that manufacturing costs are increased, and such a problem that these components influence the size and weight of the battery.

SUMMARY OF THE INVENTION

An object of the present invention is to provide a negative electrode terminal for a lithium ion battery in which the positive electrode side is connected to a negative electrode portion made of a Cu-based material by a bus bar made of an Al-based material, capable of providing sufficient bonding strength between the negative electrode terminal and the negative electrode portion and between the negative electrode terminal and the bus bar when the negative electrode terminal is not connected to the negative electrode portion and the bus bar by mechanical fastening with a screw or the like but is metallurgically bonded to the negative electrode portion and the bus bar by resistance welding, laser beam welding, or the like, for example and capable of reducing the number of components required for connection and improving productivity. Another object of the present invention is to provide a cover member for a lithium ion battery including the negative electrode terminal and a lithium ion battery employing the cover member.

The inventors have found that the aforementioned problems can be solved by applying the clad structure of a Cu-based material and an Al-based material to a negative electrode terminal itself and providing a reaction-suppressing layer capable of suppressing a metallurgical reaction between the Cu-based material and the Al-based material in the negative electrode terminal and have conceived the present invention.

In other words, a negative electrode terminal for a lithium ion battery according to the present invention is a negative electrode terminal for a lithium ion battery made of a clad material having a first metal layer made of Al or an Al alloy and a second metal layer made of Cu or a Cu alloy bonded to each other through a reaction-suppressing layer suppressing a reaction therebetween. Although the reaction-suppressing layer has high electrical resistance as compared with Al and Cu and increases the electrical resistance of the negative electrode terminal, the reaction-suppressing layer is necessary to suppress the reaction.

According to the present invention, the reaction-suppressing layer is preferably made of any of Ni or a Ni alloy and Ti or a Ti alloy.

The first metal layer and the second metal layer preferably have flat surfaces.

Furthermore, according to the present invention, the negative electrode terminal for a lithium ion battery can comprise a bonding layer on the negative electrode side of the second metal layer.

The bonding layer is preferably made of any of brazing filler metal containing Cu, Ni or a Ni alloy, and Fe or a Fe alloy.

The second metal layer can be a metal layer made of brazing filler metal containing Cu.

In addition, according to the present invention, the first metal layer preferably has a thickness larger than the sum of the thicknesses of layers other than the first metal layer.

The second metal layer preferably has a thickness larger than the sum of the thicknesses of layers excluding the first metal layer other than the second metal layer.

Moreover, according to the present invention, the negative electrode terminal for a lithium ion battery preferably has a bonding interface to which exposure prevention processing is applied.

Employing the aforementioned negative electrode terminal for a lithium ion battery according to the present invention, a cover member for a lithium ion battery can be configured.

In other words, a cover member for a lithium ion battery according to the present invention includes any of the aforementioned negative electrode terminals and has a cover material made of a metal material provided with a hole, while the negative electrode terminal is supported in an electrically insulated state in the hole.

The negative electrode terminal is preferably supported in the hole while protruding from a surface of the cover material.

Employing the aforementioned cover member for a lithium ion battery according to the present invention, a lithium ion battery can be configured.

In other words, a lithium ion battery according to the present invention employs any of the aforementioned cover members and includes a housing member housing at least a negative electrode portion made of Cu or a Cu alloy, a positive electrode portion made of Al or an Al alloy, and an electrolyte, while the housing member is hermetically sealed by the cover member, and the negative electrode portion is connected with the negative electrode terminal.

According to the present invention, employing the aforementioned lithium ion battery, a plurality of lithium ion batteries, the positive electrode sides of which are electrically connected to the negative electrode terminal in series by a bus bar made of Al or an Al alloy, can be obtained.

In the negative electrode terminal for a lithium ion battery according to the present invention, the reaction-suppressing layer can suppress the metallurgical reaction between the Cu-based material and the Al-based material when the negative electrode portion made of Cu or the Cu alloy is metallurgically connected to the bus bar made of Al or the Al alloy by welding or the like in the lithium ion battery, and hence the negative electrode portion can be connected to the bus bar with sufficient bonding strength. In addition, the negative electrode terminal according to the present invention has the first metal layer made of Al or the Al alloy similar to the bus bar and the second metal layer made of Cu or the Cu alloy similar to the negative electrode portion, and hence a more strong bonding state can be easily obtained as compared with the case where the bus bar is directly connected to the negative electrode portion.

Thus, according to the present invention, the Al-based bus bar can be employed instead of the conventional Cu-based bus bar, and hence the weight of the lithium ion battery can be reduced. Furthermore, the bus bar and the negative electrode portion can be connected to each other by the single negative electrode terminal according to the present invention, and hence reduction in the weight and size of the lithium ion battery, improvement in productivity, and reduction in manufacturing costs can be expected.

In the cover member for a lithium ion battery according to the present invention, the aforementioned negative electrode terminal according to the present invention can be employed in its simple form. Furthermore, the lithium ion battery according to the present invention having a simple structure and the plurality of lithium ion batteries according to the present invention coupled to each other by the Al-based bus bar, further reduced in weight than the conventional bus bar can be obtained.

DESCRIPTION OF THE PREFERRED EMBODIMENTS

Figure 1:
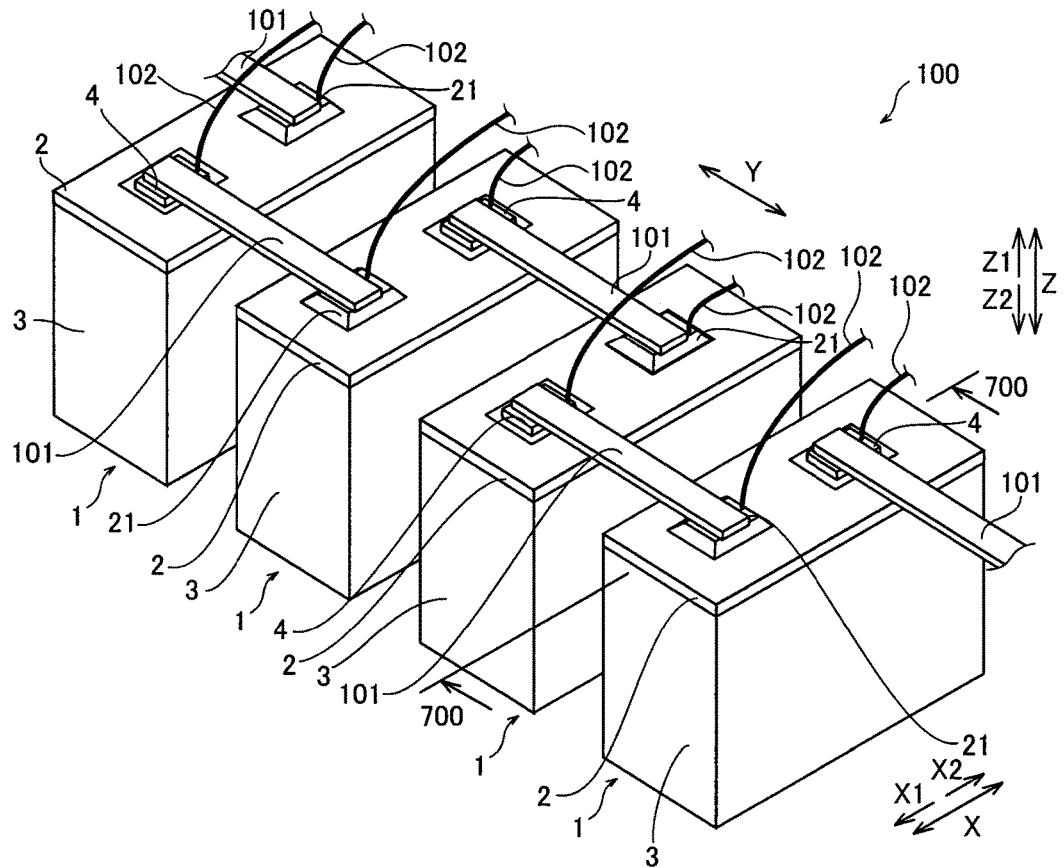
FIG. 1 is a perspective view showing exemplary lithium ion batteries according to the present invention coupled by bus bars according to a first embodiment of the present invention.

The most important technical feature of a negative electrode terminal for a lithium ion battery according to the present invention is to bond a first metal layer made of Al or an Al alloy and a second metal layer made of Cu or a Cu alloy to each other through a reaction-suppressing layer capable of suppressing a reaction of a Cu-based material with an Al-based material.

Specifically, the negative electrode terminal according to the present invention has at least the first metal layer made of Al or the Al alloy and the second metal layer made of Cu or the Cu alloy, and the first metal layer and the second metal layer are made of clad materials bonded through the reaction-suppressing layer suppressing the reaction.

In the lithium ion battery, a negative electrode portion made of Cu or a Cu alloy and a bus bar made of Al or an Al alloy are connected to each other by the negative electrode terminal according to the present invention. In this case, both the bus bar and the first metal layer of the negative electrode terminal according to the present invention are made of similar materials of Al or the Al alloys, so that even when the bus bar is metallurgically bonded to the first metal layer by resistance welding, laser beam welding, or the like, for example, an intermetallic compound having weak mechanical strength is not generated in spite of heat in welding, and sufficient bonding strength can be provided between the bus bar and the negative electrode terminal according to the present invention.

Similarly, both the negative electrode portion, made of Cu or the Cu alloy, of the lithium ion battery and the second metal layer of the negative electrode terminal according to the present invention are made of similar materials of Cu or the Cu alloys, so that even when the negative electrode portion is metallurgically bonded to the second metal layer by resistance welding, laser beam welding, or the like, for example, an intermetallic compound having weak mechanical strength is not generated in spite of heat in welding, and sufficient bonding strength can be provided between the negative electrode portion and the negative electrode terminal according to the present invention.

In the case where the negative electrode portion and the bus bar are connected to each other through the negative electrode terminal according to the present invention by resistance welding, laser beam welding, or the like, for example, as described above, the heat in welding is transferred from the first metal layer side to the second metal layer side or from the second metal layer side to the first metal layer side. At this time, due to this heat transfer, Al or the Al alloy constituting the first metal layer attempts to diffuse toward the second metal layer, for example. However, the negative electrode terminal according to the present invention has the first metal layer and the second metal layer bonded to each other through the reaction-suppressing layer, whereby this reaction-suppressing layer stops diffusion of Al or the Al alloy constituting the first metal layer and suppresses generation of the intermetallic compound between the Al-based material and the Cu-based material. Thus, Al or the Al alloy constituting the first metal layer hardly reacts with Cu or the Cu alloy constituting the second metal layer, generation of the intermetallic compound having weak mechanical strength is suppressed, and inside the negative electrode terminal according to the present invention, reduction in bonding strength can be prevented.

Therefore, even if a metallurgical connection method with heat generation, such as welding, is applied when the negative electrode portion made of Cu or the Cu alloy is connected to the bus bar made of Al or the Al alloy in the lithium ion battery, the negative electrode portion can be connected to the bus bar with sufficient bonding strength by the negative electrode terminal according to the present invention.

Furthermore, as the negative electrode terminal according to the present invention, the clad material having at least the first metal layer and the second metal layer bonded to each other through the reaction-suppressing layer is applied. In the clad material, the layers are bonded to each other with sufficient bonding strength between the layers (on a bonding interface) by pressure in bonding the layers to each other by a clad rolling machine or the like. Thus, also in this regard, the negative electrode terminal made of the clad material according to the present invention is suitable for connecting the negative electrode portion to the bus bar with sufficient bonding strength.

Thus, in the case of wishing to obtain the structure of coupling a plurality of single lithium ion batteries to each other, the bus bar made of Al or the Al alloy can be employed with respect to the negative electrode terminal according to the present invention, and hence the weight can be sufficiently reduced as compared with the case where a bus bar made of a Cu-based material having a larger density (specific gravity) is employed. In addition, the negative electrode portion and the bus bar can be connected to each other without mechanical connection with screws or the like, and hence such advantageous effects that the number of threaded fasteners such as bolts, nuts, and washers can be reduced, production efficiency can be improved by simpler welding easy to automate or the like, and the structure of fastening the bus bar to the negative electrode portion can be downsized can be obtained.

The structure of the negative electrode terminal according to the present invention considered preferable by the inventors is now described.

In the negative electrode terminal according to the present invention, it is preferable that the reaction-suppressing layer be made of any of Ni or a Ni alloy and Ti or a Ti ally, for example, having a melting point higher than that of the Al-based material. In terms of temperature at which different metal materials react with each other and an intermetallic compound is generated, the intermetallic compound is generated at lower temperature in the combination of the Al-based material and a Cu-based material than in the combination of the Al-based material and a Ni-based material when the former is compared with the latter. Therefore, it can be said that in the latter, the intermetallic compound is more difficult to generate by the temperature difference. In other words, reaction hardly occurs in the latter due to the higher melting point. In the case of the latter, the intermetallic compound considered to be generated by reaction may be a Ni—Al compound, and this is a compound having sufficient mechanical strength. This is why Ni or the Ni alloy is preferable.

The same holds true for the case where the combination of the Cu-based material and the Al-based material is compared with the combination of the Cu-based material and the Ni-based material. Therefore, in the case where the Al-based material and the Cu-based material are bonded to each other through the Ni-based material, namely, Ni or the Ni alloy, the intermetallic compound having a weak mechanical strength is hardly generated, as compared with the case where the Al-based material and the Cu-based material are directly bonded to each other, and hence it is effective to prevent reduction in bonding strength. This effectiveness of employing Ni or the Ni alloy can be obtained also when Ti or the Ti alloy is employed.

In the negative electrode terminal according to the present invention, it is preferable that surfaces of the first metal layer and the second metal layer be flat. Generally, the bus bar is exclusively in the form of a flat plate capable of being easily and inexpensively processed. Thus, in the case where the bus bar in the form of a flat plate is connected to the negative electrode terminal according to the present invention, the bus bar can be easily connected to the negative electrode terminal by bringing the flat surface of the bus bar into close contact with the flat surface of the negative electrode terminal when the surface of the first metal layer is flat. Similarly, the negative electrode portion of the lithium ion battery is also exclusively in the form of a flat plate capable of being easily and inexpensively processed, and hence the negative electrode portion in the form of a flat plate can be easily connected to the negative electrode terminal according to the present invention when the surface of the second metal layer is flat. Furthermore, due to the flat connection, the contact area is increased, so that electrical resistance (contact resistance) resulting from the contact area can be reduced. In addition, a wire or the like for measuring the state of the battery such as the degree of deterioration is easily placed.

The negative electrode terminal according to the present invention can have a bonding layer on the negative electrode side of the second metal layer. The negative electrode terminal has the bonding layer, whereby the heat capacity and heat radiation area of the negative electrode terminal can be increased. Consideration is given to the case where the negative electrode portion is connected to the second metal layer by resistance welding, laser beam welding, or the like, for example. The aforementioned heat capacity and heat radiation area are increased as compared with the case where the negative electrode portion is directly welded to the second metal layer, so that in welding, heat transfer to the reaction-suppressing layer can be slowed, and temperature rise can be suppressed. Furthermore, when the structure of providing the bonding layer is selected, the input of weld energy and the temperature rise in the vicinity of the bonding portion in welding can also be suppressed by selecting a material having thermal conductivity lower than that of the second metal layer, for example. When the temperature is high as described above, a reaction resulting from heat may occur between the second metal layer and the reaction-suppressing layer or between the first metal layer and the reaction-suppressing layer. Therefore, according to the present invention, the bonding layer is further provided on the second metal layer, whereby such an effect that the aforementioned reaction hardly occurs can be increased.

In the negative electrode terminal according to the present invention, it is preferable that the bonding layer be made of any of brazing filler metal containing Cu, Ni or a Ni alloy, and Fe or a Fe alloy. The brazing filler metal containing Cu is a material similar to Cu constituting the negative electrode portion and the second metal layer, and hence electrical resistance (contact resistance) is rendered smaller than in the case where a dissimilar material is employed, so that bonding can be easily performed with high bonding strength. Ni or the Ni alloy reacts with Cu constituting the negative electrode portion and the second metal layer, and a Ni—Cu alloy, which is a solid solution having mechanical strength, is generated. Utilizing this property, the Ni—Cu alloy is generated between the bonding layer and the negative electrode portion, and the bonding layer and the second metal layer, whereby the negative electrode portion and the second metal layer can be connected to each other through the bonding layer with high bonding strength. This effectiveness of employing Ni or the Ni alloy can be obtained also when Fe or the Fe alloy is employed.

In the negative electrode terminal according to the present invention, the second metal layer may be a metal layer made of brazing filler metal containing Cu. The brazing filler metal containing Cu is a material similar to Cu constituting the negative electrode portion, and hence the effects equivalent to those of the second metal layer can be obtained. The second metal layer made of the brazing filler metal containing Cu can have such usefulness of the bonding layer that connection with the negative electrode portion is facilitated as described above.

In the negative electrode terminal according to the present invention, it is preferable that the thickness of the first metal layer be larger than the sum of the thicknesses of layers other than the first metal layer. The negative electrode terminal is configured in this manner, whereby a proportion of the first metal layer made of Al or the Al alloy having a smaller density (specific gravity) can be rendered larger than a proportion of the reaction-suppressing layer and the second metal layer made of Cu or the Cu alloy having a larger density (specific gravity). Thus, the weight of the negative electrode terminal according to the present invention can be reduced.

In the negative electrode terminal according to the present invention, it is preferable that the thickness of the second metal layer be larger than the sum of the thicknesses of layers excluding the first metal layer other than the second metal layer. The negative electrode terminal is configured in this manner, whereby a proportion of the second metal layer made of Cu or the Cu alloy having smaller electrical resistance resulting from the material can be rendered large. Thus, the electrical resistance inside the negative electrode terminal according to the present invention can be reduced while the weight reduction is maintained. Furthermore, the reaction-suppressing layer is thinned, whereby heat generation in the reaction-suppressing layer in resistance welding can be suppressed.

In the negative electrode terminal according to the present invention, it is preferable that exposure prevention processing be applied to the bonding interfaces of the negative electrode terminal. The negative electrode terminal made of the clad material according to the present invention can be processed in the form of a square flat plate by press punching or the like, for example, to be employed. In this case, the bonding interfaces of the individual layers are exposed to air on the punched end surfaces (side surfaces) of the flat plate. In this usage pattern, exposure prevention processing may be applied to the exposed bonding interfaces. In other words, the bonding interfaces are covered by application of a resin material or the like or adhesion of a rubber material or the like, for example, such that the respective side surfaces of the first metal layer, the second metal layer, and the reaction-suppressing layer are covered and the side surfaces of the negative electrode terminal are circumferentially surrounded in a plan view. Thus, an electrical short circuit of the negative electrode terminal generally having a negative polarity with respect to a cover material of the battery having a positive polarity does not occur in the case where the negative electrode terminal according to the present invention is applied to the lithium ion battery. Furthermore, leakage of an electrolyte of the battery and damage of the bonding interfaces resulting from infiltration can be prevented, so that reduction in the bonding strength can be prevented.

Employing the aforementioned negative electrode terminal for a lithium ion battery according to the present invention, a cover member for a lithium ion battery can be configured.

Specifically, the cover member for a lithium ion battery includes the negative electrode terminal according to the present invention and a cover material made of a metal material provided with a hole and supports the negative electrode terminal in an electrically insulated state in the hole. The cover member according to the present invention includes the negative electrode terminal having the aforementioned excellent functions and effects according to the present invention, and hence the cover member has reliability higher than that of a conventional cover member, and the structure thereof particularly around the negative electrode terminal can be simplified and be reduced in size. Thus, the cover member according to the present invention is preferable. Furthermore, in the cover member, the negative electrode terminal is supported in the electrically insulated state, and hence an electrical short circuit between the cover material generally having a positive polarity and the negative electrode terminal having a negative polarity does not occur.

It is preferable that the cover member according to the present invention support the negative electrode terminal in a state of protruding from a surface of the cover material in the hole provided in the cover material. More specifically, the cover member is configured to support the negative electrode terminal at a position where the surface of the first metal layer of the negative electrode terminal protrudes from the surface of the cover material. According to this structure, the bus bar can be easily connected to the first metal layer of the negative electrode terminal, and an electrical short circuit between the cover material and the bus bar does not occur even when the bus bar is directly connected. The negative electrode terminal having the aforementioned bonding interfaces to which the exposure prevention processing is applied is employed, and electrical insulation properties and mechanical elasticity are provided to a portion of the negative electrode terminal to which the exposure prevention processing is applied, whereby the cover member having a simple structure according to the present invention can be easily obtained by such a simple method that the negative electrode terminal is fitted into the hole provided in the cover material. In addition, infiltration of the electrolyte of the battery into the bonding interfaces of the individual layers of the negative electrode terminal can be prevented.

Employing the aforementioned cover member for a lithium ion battery according to the present invention, a lithium ion battery can be configured.

Specifically, the lithium ion battery employs the cover member according to the present invention and has a housing member housing at least the negative electrode portion made of Cu or the Cu alloy, the positive electrode portion made of Al or the Al alloy, and the electrolyte, and in the lithium ion battery, the housing member is hermetically sealed by the cover member, and the negative electrode terminal is connected to the negative electrode portion. Furthermore, the housing member also can house a particular separator for separating the positive electrode portion and the negative electrode portion from each other. The lithium ion battery according to the present invention employs the cover member including the negative electrode terminal having the aforementioned excellent functions and effects according to the present invention, and hence the lithium ion battery has reliability higher than that of a conventional lithium ion battery, and in particular, the structure of a cover portion can be simplified and be reduced in size. Thus, the lithium ion battery according to the present invention is preferable.

The lithium ion battery according to the present invention is employed, and the positive electrode side of one lithium ion battery and the negative electrode terminal of another lithium ion battery are electrically connected to each other in series by the bus bar made of Al or the Al alloy, whereby a lithium ion battery (lithium ion battery connections) having a structure of coupling a plurality of lithium ion batteries can be obtained. The lithium ion battery connections having this structure can be further reduced in weight and size than conventional lithium ion battery connections employing a Cu-based bus bar. Furthermore, an Al-based material less expensive than a Cu-based material is employed, whereby manufacturing costs associated with materials can be reduced, so that the less expensive lithium ion battery connections can be provided. It can be said that the quality and reliability of the structure of the lithium ion battery are further increased than ever before by applying the negative electrode terminal according to the present invention.

Several embodiments of the present invention are hereinafter described in detail using the drawings properly.

First Embodiment

The structure of each of a negative electrode terminal for a lithium ion battery 4, a cover member 2, a lithium ion battery 1, and lithium ion battery connections 100 according to a first embodiment of the present invention is now described with reference to FIGS. 1 to 5.

The lithium ion battery connections 100 according to the first embodiment of the present invention can be applied to a large-sized battery system employed in an electric vehicle (EV), a hybrid electric vehicle (HEV), a residential electric storage system, etc. These lithium ion battery connections 100 are configured as a collection of lithium ion batteries 1 by electrically connecting a single lithium ion battery 1 to another single lithium ion battery 1 in series by a bus bar 101 in the form of a flat plate, as shown in FIG. 1. The lithium ion battery 1 here is an example of the "lithium ion battery" in the present invention.

Figure 2:
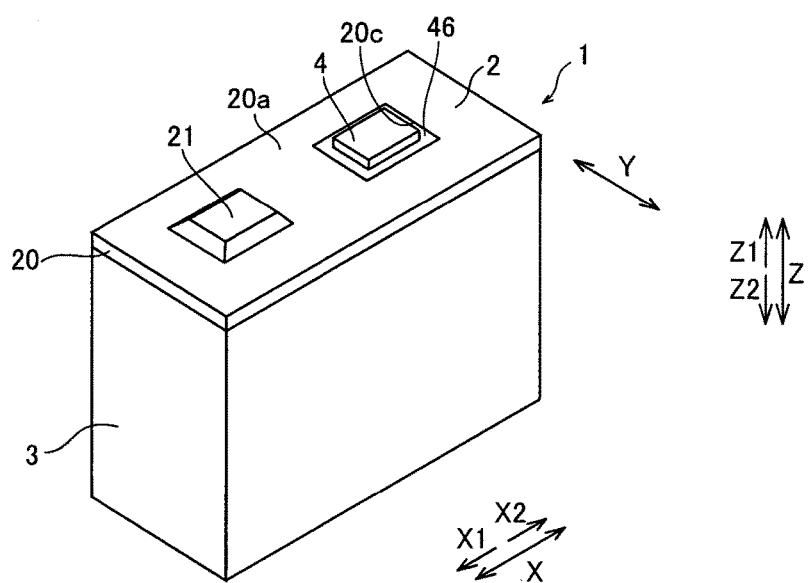
FIG. 2 is a perspective view showing one extracted from the lithium ion batteries according to the present invention shown in FIG. 1.

Specifically, the lithium ion battery 1 has a substantially rectangular parallelepiped shape, as shown in FIG. 2, and includes the cover member 2 arranged on the upper side (Z1 side) and a battery case body 3 arranged on the lower side (Z2 side) of the cover member 2, housing a positive electrode portion 5, a negative electrode portion 6, and a separator 103. This battery case body 3 is made of Al. The cover member 2 here is an example of the "cover member for a lithium ion battery" in the present invention.

The cover member 2 has a rectangular shape in a plan view (as viewed from above) and includes a plate-like cover material 20 made of Al, a positive electrode terminal 21 arranged on one side (X1 side) in the extensional direction (direction X) of the long side of the cover material 20 and a negative electrode terminal 4 arranged on the other side (X2 side) in the extensional direction of the long side of the cover material 20. This cover material 20 is made of Al the same as the battery case body 3. The positive electrode terminal 21 is formed by pressing the cover material 20 so as to protrude upward (to the Z1 side) from the upper surface 20a of the cover material 20. The negative electrode terminal 4 is individually formed and is supported by the cover material 20 while protruding upward (to the Z1 side) from the upper surface 20a of the cover material 20. The negative electrode terminal 4 here is an example of the "negative electrode terminal for a lithium ion battery" in the present invention.

As shown in FIG. 1, in the lithium ion battery connections 100, a plurality of lithium ion batteries 1 are aligned along the extensional direction (direction Y) of the short side of the lithium ion battery 1, namely, the short side of the cover material 20 in a plan view. Furthermore, in the lithium ion battery connections 100, the lithium ion battery 1 in which the positive electrode terminal 21 is arranged on one side (X1 side) in the direction X and the negative electrode terminal 4 is arranged on the other side (X2 side) and the lithium ion battery 1 in which the positive electrode terminal 21 is arranged on the X2 side and the negative electrode terminal 4 is arranged on the X1 side are alternately arranged along the direction Y.

The positive electrode terminal 21 of a prescribed lithium ion battery 1 is welded (bonded) to an end in the direction Y of the bus bar 101 extending in the direction Y by resistance welding. Similarly, the negative electrode terminal 4 of a lithium ion battery 1 adjacent to the prescribed lithium ion battery 1 is welded to an end in the direction Y of the bus bar 101 by resistance welding. In other words, the positive electrode terminal 21 of the prescribed lithium ion battery 1 is connected to the negative electrode terminal 4 of the adjacent lithium ion battery 1 through the bus bar 101. In this manner, the lithium ion battery connections 100 having the plurality of lithium ion batteries 1 connected to each other in series by the bus bar 101 are configured.

Individual wires 102 are welded to the positive electrode terminal 21 and the negative electrode terminal 4 of the lithium ion battery 1 by ultrasonic welding. These wires 102 are connected to regions of the negative electrode terminal 21 and the negative electrode terminal 4 to which bus bars 101 are not bonded. The wires 102 are connected to an unshown measurement device for measuring the power generation state or the like of the lithium ion battery 1 connected thereto or a measurement portion attached to the lithium ion battery. Thus, the state of the lithium ion battery 1 such as the degree of deterioration can be measured and grasped, and hence the amount of charge and discharge of the lithium ion battery 1 can be monitored.

Figure 3:
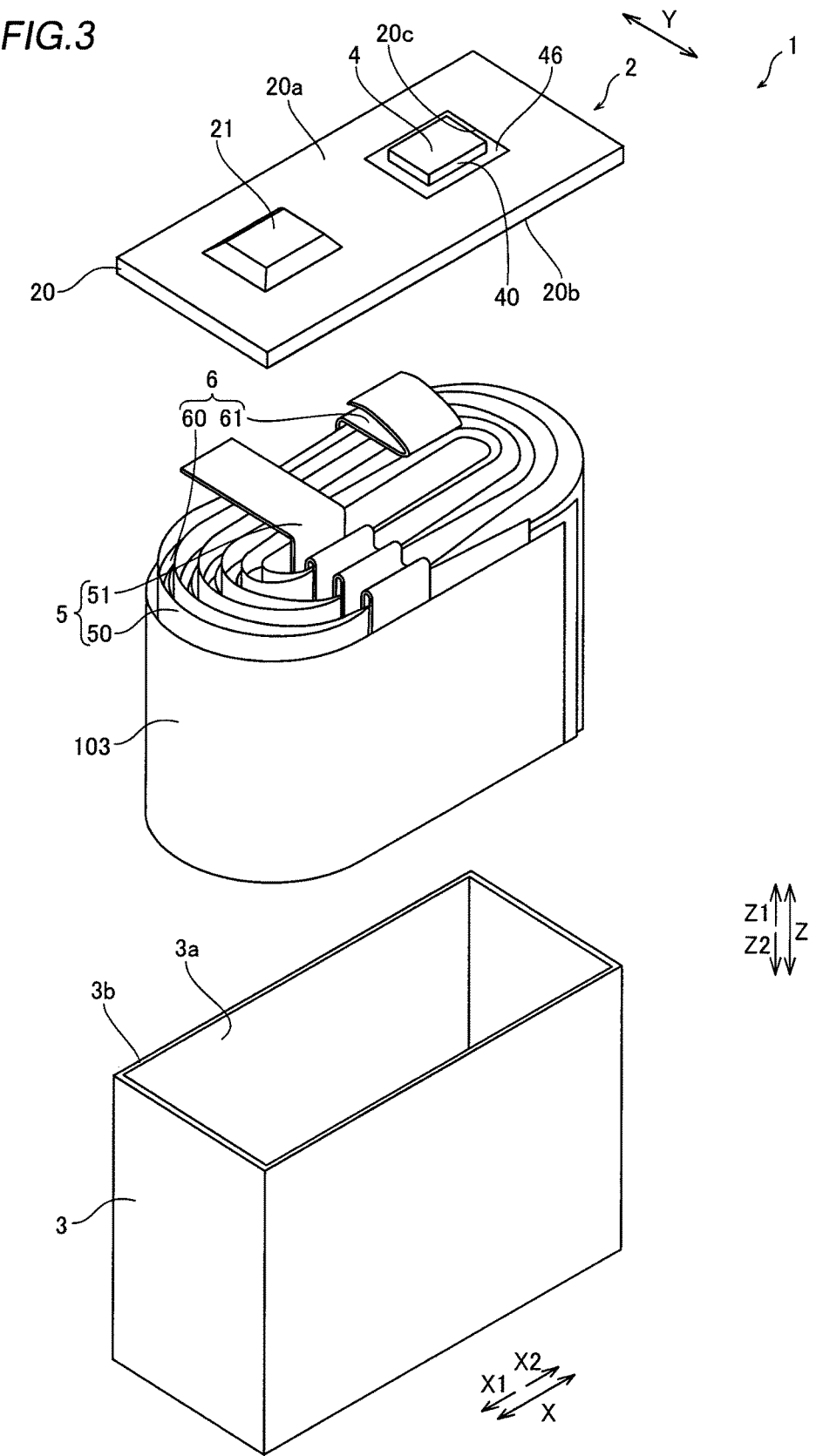
FIG. 3 is an exploded perspective view showing the lithium ion battery shown in FIG. 2.

The lithium ion battery 1 includes the positive electrode portion 5, the negative electrode portion 6, the separator 103 separating the positive electrode portion 5 and the negative electrode portion 6 from each other, and an electrolyte (not shown), as shown in FIG. 3. The positive electrode portion 5 is constituted by a positive electrode 50 made of Al foil, coming into contact with the electrolyte and a current collecting portion 51 made of Al, electrically connected to the positive electrode 50. The negative electrode portion 6 is constituted by a negative electrode 60 made of Cu foil, coming into contact with the electrolyte and a current collecting portion 61 made of Cu, electrically connected to the negative electrode 60. These positive electrode 50 and negative electrode 60 are isolated by the separator 103 and are stacked in a roll shape in an insulated state.

In a state where the positive electrode portion 5, the negative electrode portion 6, and the electrolyte are housed in a housing portion 3a of the battery case body 3, the upper end surface 3b of the battery case body 3 and the outer edge of the lower surface 20b of the cover material 20 are welded to each other. Thus, leakage of the electrolyte from between the cover member 2 and the battery case body 3 is prevented, and the housing portion 3a of the lithium ion battery 1 is put into a hermetically sealed state.

Figure 4:
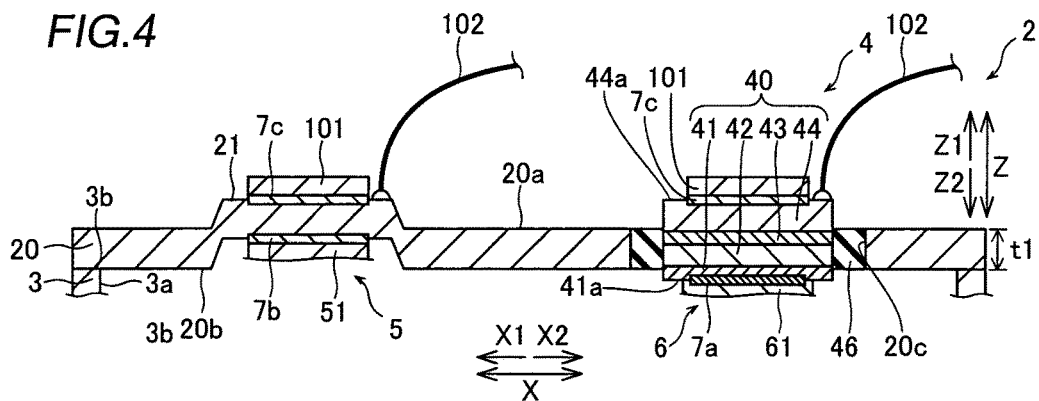
FIG. 4 is a partial sectional view taken along the line 700-700 in FIG. 1.

As shown in FIG. 4, the cover material 20 of the cover member 2 has a thickness t1 of about 1 mm in the thickness direction (direction Z). The positive electrode terminal 21 is formed by protruding a part on the X1 side of the cover material 20 upward (to the Z1 side) from the upper surface 20a of the cover material 20 by pressing, as described above. In other words, the positive electrode terminal 21 is formed integrally with the cover material 20 and is made of Al. A hole 20c passing through the cover member 20 in the thickness direction is formed on the X2 side of the cover material 20. The hole 20c is squarely formed in a plan view, as shown in FIG. 3. The negative electrode terminal 4 is supported by the cover material 20 through an insulating portion 46 such that the intersection (center) of the diagonal lines of the hole 20c substantially coincides with the intersection (center) of the diagonal lines of the negative electrode terminal 4 in the hole 20c.

Figure 5:
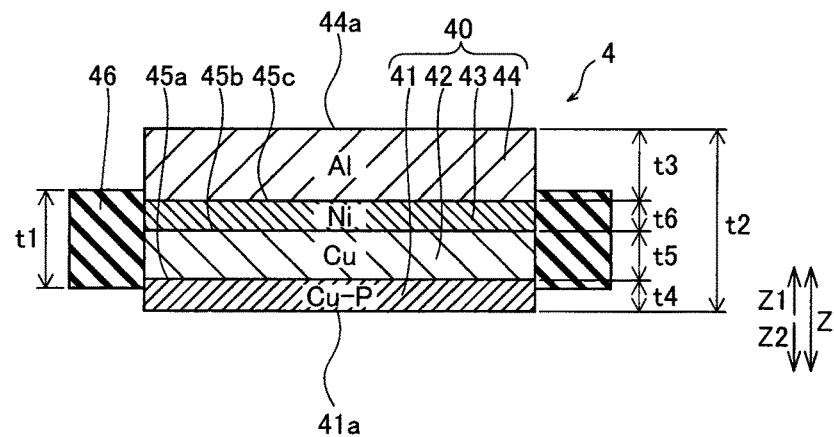
FIG. 5 is a partial sectional view showing the lithium ion battery including an exemplary negative electrode terminal according to the present invention shown in FIG. 4.

According to the first embodiment, the negative electrode terminal 4 has a rectangular shape smaller than that of the hole 20c of the cover material 20 in a plan view. As shown in FIG. 5, the negative electrode terminal 4 is made of a clad material having four layers of a brazing filler metal layer 41 (Cu—P), a Cu layer 42, a Ni layer 43, and an Al layer 44 bonded with sufficient bonding strength sequentially from the side of the negative electrode portion 6 (see FIG. 4) (the lower side (the Z2 side)). In this first embodiment, a layer corresponding to the first metal layer according to the present invention is the Al layer 44, a layer corresponding to the second metal layer according to the present invention is the Cu layer 42, and a layer corresponding to the reaction-suppressing layer according to the present invention is the Ni layer 43. In addition, a layer corresponding to the bonding layer preferably provided according to the present invention is the brazing filler metal layer 41.

In the lithium ion battery 1, this negative electrode terminal 4 has the function of a terminal portion 40 on the negative electrode side. This terminal portion 40 is configured such that the Al layer 44 is exposed to a surface 44a on the upper side (Z1 side) of the terminal portion 40 and the brazing filler metal layer 41 is exposed to a surface 41a on the lower side (Z2 side) of the terminal portion 40. The Al layer 44 of this terminal portion 40 is welded (bonded) to the bus bar 101 with sufficient bonding strength, and the brazing filler metal layer 41 is welded (bonded) to the current collecting portion 61 of the negative electrode portion 6 with sufficient bonding strength.

The aforementioned Al layer 44 is made of Al having a density (specific gravity) smaller than that of a Cu-based material and having a smaller density among Al-based materials, similarly to the positive electrode terminal 21 and the bus bar 101 (see FIG. 1). The Cu layer 42 is made of Cu having electrical resistance smaller than that of an Au-based material and having smaller electrical resistance among Cu-based materials, similarly to the positive electrode terminal 21 and the bus bar 101 (see FIG. 1). The Ni layer 43 is made of Ni suppressing generation of an intermetallic compound having weak mechanical strength between Al and Cu in a temperature range in which an intermetallic compound of Al and Cu is generated. The brazing filler metal layer 41 is made of phosphor copper brazing filler metal (Cu—P) containing Cu and P of about 3 mass % and has a melting point of about 710° C.

The terminal portion 40 has a thickness t2 of about 2 mm in the thickness direction (direction Z). In other words, the thickness t2 of the terminal portion 40 is larger than the thickness t1 of the cover material 20 (about 1 mm; see FIG. 4). The thickness t3 of the Al layer 44 is larger than the sum of the thickness t5 of the Cu layer 42, the thickness t6 of the Ni layer 43, and the thickness t4 of the brazing filler metal layer 41. The thickness t5 of the Cu layer 42 is larger than the sum of the thickness t6 of the Ni layer 43 and the thickness t4 of the brazing filler metal layer 41.

Both the surface 44a on the Z1 side of the Al layer 44 arranged to be exposed and the surface 41a on the Z2 side of the brazing filler metal layer 41 are flattened. In this case, a material having a flat surface on the Z2 side for the Cu layer 42 is employed to form the brazing filler metal layer 41 on the clad material. The surface on the Z1 side of the positive electrode terminal 21 is flattened, similarly to the surface 44a of the Al layer 44.

The negative electrode terminal 4 is supported by the cover material 20 through the frame-shaped insulating portion 46 formed to partially cover the side surfaces of the terminal portion 40 of the negative electrode terminal 4 in the thickness direction (direction Z), as shown in FIGS. 3 and 4. Specifically, the insulating portion 46 covers the side surfaces of the Al layer 44 located on the Z1 side of the terminal portion 40, the side surfaces of the Ni layer 43, the side surfaces of the Cu layer 42, and the side surfaces of the brazing filler metal layer 41 located on the Z2 side of the terminal portion 40, as shown in FIG. 5. Furthermore, the insulating portion 46 is configured to circumferentially surround the negative electrode terminal 4 in a plan view, as shown in FIG. 4. Thus, the insulating portion 46 is configured to cover a bonding interface 45c between the Al layer 44 and the Ni layer 43, a bonding interface 45b between the Ni layer 43 and the Cu layer 42, and a bonding interface 45a between the Cu layer 42 and the brazing filler metal layer 41 and not to expose the bonding interfaces on the side surfaces of the negative electrode terminal 4, as shown in FIG. 5.

The aforementioned insulating portion 46 is made of resin having insulation properties and being resistant to an electrolyte. As shown in FIG. 4, the insulating portion 46 has a thickness substantially equal to the thickness t1 (about 1 mm) of the cover material 20. In other words, the thickness of the insulating portion 46 is smaller than the thickness t2 (about 2 mm) of the terminal portion 40. Thus, the insulating portion 46 is configured to be coplanar with the upper surface 20a and the lower surface 20b of the cover material 20 in a state where the negative electrode terminal 4 is arranged in the hole 20c of the cover material 20.

In the state where the negative electrode terminal 4 is arranged in the hole 20c of the cover material 20, the outer surface of the insulating portion 46 and the inner peripheral surface of the hole 20c come into contact with each other to be opposed to each other. Thus, the negative electrode terminal 4 can be supported by the cover material 20 through the insulating portion 46. Furthermore, in the state where the negative electrode terminal 4 is arranged in the hole 20c of the cover material 20, the Al layer 44 of the terminal portion 40 of the negative electrode terminal 4 protrudes upward (to the Z1 side) from the upper surface 20a of the cover material 20, and the brazing filler metal layer 41 of the terminal portion 40 protrudes downward (to the Z2 side) from the lower surface 20b of the cover material 20.

As shown in FIG. 4, the brazing filler metal layer 41 of the negative electrode terminal 4 and the current collecting portion 61 of the negative electrode portion 6 are bonded to each other by resistance welding on the side of the lower surface 20b of the cover material 20. Thus, a bonding portion 7a is formed in a region between the brazing filler metal layer 41 and the current collecting portion 61 corresponding to the welded region. Mainly, the brazing filler metal layer 41 made of phosphor copper brazing filler metal partially melts, whereby this bonding portion 7a is formed. In other words, the bonding portion 7a is formed as a metal layer containing Cu. Furthermore, the positive electrode terminal 21 and the current collecting portion 51 of the positive electrode portion 5 are bonded to each other by resistance welding. Thus, a metal layer made of Al is formed as a bonding portion 7b in a region between the positive electrode terminal 21 and the current collecting portion 51 corresponding to the welded region.

On the side of the upper surface 20a of the cover material 20, the Al layer 44 of the negative electrode terminal 4 and the bus bar 101 are bonded to each other by resistance welding. Furthermore, the positive electrode terminal 21 and the bus bar 101 are bonded to each other by resistance welding. Thus, metal layers made of Al are formed as bonding portions 7c in a region between the Al layer 44 and the bus bar 101 corresponding to the welded region and in a region between the positive electrode terminal 21 and the bus bar 101 corresponding to the welded region.

Exemplary manufacturing processes for the aforementioned negative electrode terminal 4, cover member 2, lithium ion battery 1, and lithium ion battery connections 100 according to the first embodiment of the present invention are now described in detail with reference to FIGS. 1 to 8.

Figure 6:
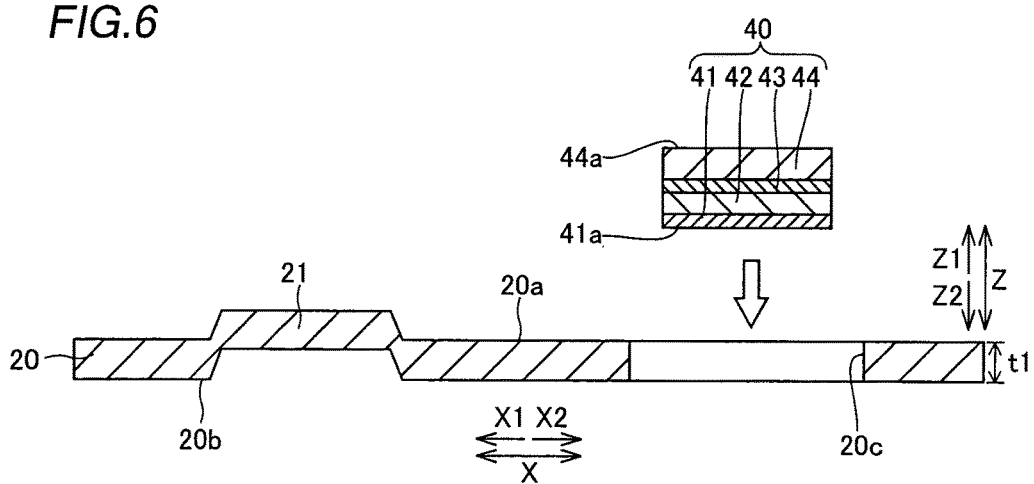
FIG. 6 is a sectional view for illustrating an exemplary manufacturing process for mounting the negative electrode terminal to the structure shown in FIG. 4.

First, an Al plate (not shown) having a thickness t1 (see FIG. 4) of about 1 mm, made of Al is prepared. Then, as shown in FIG. 6, the X1 side of the Al plate is protruded upward (to the Z1 side) from the upper surface 20a of the Al plate by pressing, whereby the positive electrode terminal 21 is formed. On the X2 side of the Al plate, the hole 20c passing through the Al plate in the thickness direction (direction Z) is formed. Thus, the cover material 20 for the lithium ion battery 1 is formed.

Then, an Al plate, a Ni plate, a Cu plate, and a plate of phosphor copper brazing filler metal (none of which shown) are prepared. At this time, the thickness of the Al plate is rendered larger than the sum of the thicknesses of the Ni plate, the Cu plate, and the plate of phosphor copper brazing filler metal. Furthermore, the thickness of the Cu plate is rendered larger than the sum of the thicknesses of the Ni plate and the plate of phosphor copper brazing filler metal. Then, the Al plate, the Ni plate, the Cu plate, and the plate of phosphor copper brazing filler metal are sequentially stacked, and the same are bonded to each other by applying a prescribed pressure by a clad rolling machine, a press device, or the like. In this case, the plate of phosphor copper brazing filler metal, the Cu plate, the Ni plate, and the Al plate may be sequentially stacked.

Thus, the clad material having four layers of the Al layer 44, the Ni layer 43, the Cu layer 42, and the brazing filler metal layer 41 stacked and bonded to each other, having a thickness t2 of about 2 mm in the thickness direction (direction Z) can be formed, as shown in FIG. 5. The clad material is formed in this manner, whereby a material for the negative electrode terminal 4 in which the Al layer 44 and the Ni layer 43 are bonded to each other on the bonding interface 45c with sufficient bonding strength, the Cu layer 42 and the Ni layer 43 are bonded to each other on the bonding interface 45b with sufficient bonding strength, and the Cu layer 42 and the brazing filler metal layer 41 are bonded to each other on the bonding interface 45a with sufficient bonding strength is obtained.

In the clad material formed in this manner, the thickness t3 of the Al layer 44 is larger than the sum of the thickness t5 of the Cu layer 42, the thickness t6 of the Ni layer 43, and the thickness t4 of the brazing filler metal layer 41. Furthermore, the thickness t5 of the Cu layer 42 is larger than the sum of the thickness t6 of the Ni layer 43 and the thickness t4 of the brazing filler metal layer 41.

The clad material obtained in this manner is processed in a square shape by press punching or the like such that the size thereof is smaller than the hole 20c of the cover material 20 (see FIG. 3) in a plan view, whereby the negative electrode terminal 4 can be formed.

Figure 7:
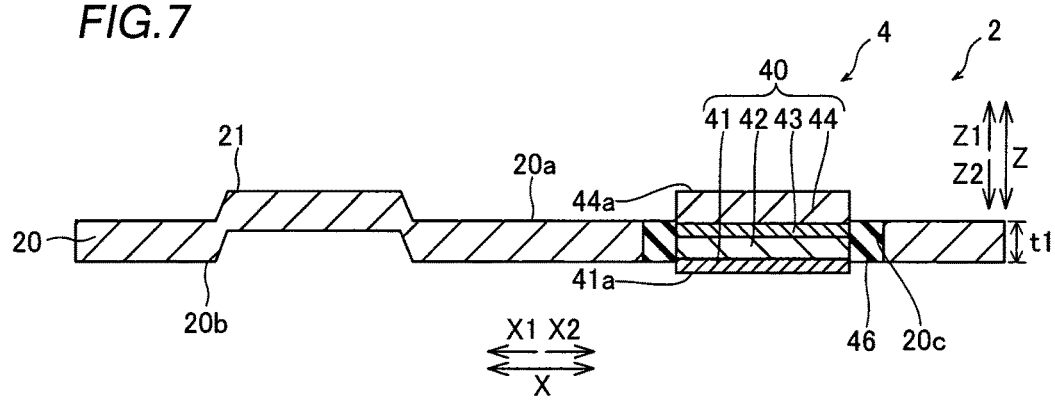
FIG. 7 is a sectional view for illustrating a continuation from the manufacturing process shown in FIG. 6.

The obtained negative electrode terminal 4 (shown as the terminal portion 40 in FIG. 6) is employed, and this negative electrode terminal 4 is arranged in the hole 20c of the cover material 20. At this time, the negative electrode terminal 4 is arranged such that the intersection (center) of the diagonal lines of the hole 20c substantially coincides with the intersection (center) of the diagonal lines of the negative electrode terminal 4 in order not to bring the side surfaces of the negative electrode terminal 4 into contact with the inner peripheral surface of the hole 20c. Then, in a state where the cover material 20 and the negative electrode terminal 4 are fixed to a mold (not shown), resin for forming the insulating portion 46 is formed by injection molding. Thus, as shown in FIG. 7, the insulating portion 46 is formed between the hole 20c of the cover material 20 and the negative electrode terminal 4 such that the thickness thereof is substantially equal to the thickness t1 (about 1 mm) of the cover material 20. At this time, the insulating portion 46 is formed to cover the side surfaces of the negative electrode terminal 4 corresponding to the bonding interface 45c between the Al layer 44 and the Ni layer 43, the bonding interface 45b between the Cu layer 42 and the Ni layer 43, and the bonding interface 45a between the Cu layer 42 and the brazing filler metal layer 41, as shown in FIG. 5. Furthermore, the insulating portion 46 is formed such that the outer surface of the insulating portion 46 and the inner peripheral surface of the hole 20c come into contact with each other. Consequently, the cover member 2 including the negative electrode terminal 4 for the lithium ion battery 1 is formed.

With the cover member 2 including the negative electrode terminal 4 obtained through the aforementioned manufacturing process and the positive electrode portion 5 and the negative electrode portion 6 for the lithium ion battery 1 shown in FIG. 3, which are separately prepared, the lithium ion battery 1 can be manufactured.

Figure 8:
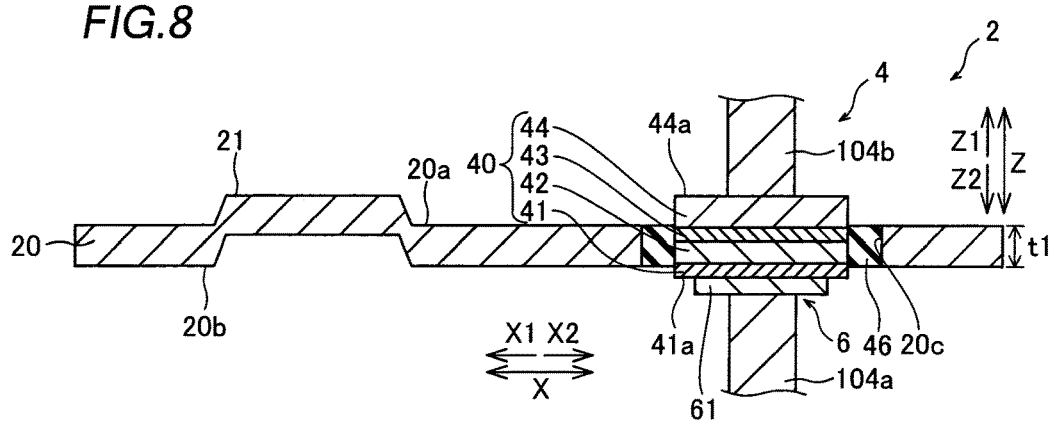
FIG. 8 is a sectional view for illustrating a continuation from the manufacturing process shown in FIG. 7.

First, on the side of the lower surface 20b of the cover material 20 of the cover member 2, the surface 41a of the brazing filler metal layer 41 of the negative electrode terminal 4 is connected to the current collecting portion 61 of the negative electrode portion 6 by resistance welding. Specifically, in a state where the surface 41a of the brazing filler metal layer 41 is brought into contact with the current collecting portion 61, an electrode 104a for resistance welding is brought into contact with the lower surface of the current collecting portion 61 from below (Z2 side), and an electrode 104b for resistance welding is brought into contact with the surface 44a of the Al layer 44 of the negative electrode terminal 4 from above (Z1 side), as shown in FIG. 8. Then, current is applied to between the electrode 104a and the electrode 104b for a prescribed period of time, whereby the brazing filler metal layer 41 of the negative electrode terminal 4 can be connected to the current collecting portion 61.

In this resistance welding, sufficient heat (about 710° C.) to melt the brazing filler metal layer 41 is generated in a region between the brazing filler metal layer 41 and the current collecting portion 61 where contact resistance is large before bonding. Consequently, the metal layer containing Cu is formed of the brazing filler metal layer 41 and the current collecting portion 61. Then, this metal layer is formed as the bonding portion 7a containing Cu when the metal layer is solidified by cooling, and the brazing filler metal layer 41 and the current collecting portion 61 are bonded to each other through the bonding portion 7a. At this time, due to the generated heat of about 710° C., Cu of the current collecting portion 61, Cu of the brazing filler metal layer 41, and Cu of the Cu layer 42 are diffused. In addition to this, Al of the Al layer 44 is also diffused. However, inside the negative electrode terminal 4, the Ni layer 43 existing between the Cu layer 42 and the Al layer 44 suppresses diffusion of Cu to the Al layer 44 (Z1 side). Simultaneously, the Ni layer 43 suppresses diffusion of Al to the Cu layer 42 (Z2 side). Therefore, inside the negative electrode terminal 4, a reaction of Al with Cu is suppressed, and hence the bonding strength is not reduced.

Subsequently to the negative electrode portion 6, on the side of the lower surface 20b of the cover material 20, the lower surface 20b of the cover material 20 corresponding to the positive electrode terminal 21 and the current collecting portion 51 of the positive electrode portion 5 are resistance welded to each other, as shown in FIG. 4, like the aforementioned case of the brazing filler metal layer 41 and the current collecting portion 61 of the negative electrode portion 6. Thus, the positive electrode terminal 21 and the current collecting portion 51 are bonded to each other through the bonding portion 7b formed as the metal layer made of Al.

Then, in a state where the positive electrode portion 5, the negative electrode portion 6, and the electrolyte are housed in the housing portion 3a of the battery case body 3, as shown in FIG. 3, the upper end surface 3b of the battery case body 3 and the outer edge of the lower surface 20b of the cover material 20 are welded to each other to be hermetically sealed. Thus, the lithium ion battery 1 shown in FIG. 2 can be obtained.

Thereafter, the plurality of lithium ion batteries 1 are arranged along the direction Y, as shown in FIG. 1. Then, on one side in the direction Y, the Al layer 44 of the terminal portion 40 of a prescribed lithium ion battery 1 and one end in the direction Y of the bus bar 101 are resistance welded to each other, and on the other side in the direction Y, the positive electrode terminal 21 of another lithium ion battery 1 adjacent to the prescribed lithium ion battery 1 and the other end in the direction Y of the bus bar 101 are resistance welded to each other. Thus, the Al layer 44 of the negative electrode terminal 4 and the bus bar 101 are bonded to each other through the bonding portion 7c formed as the metal layer of Al, and the positive electrode terminal 21 and the bus bar 101 are bonded to each other through the bonding portion 7c formed as the metal layer of Al, whereby the plurality of lithium ion batteries 1 are connected to each other in series by a plurality of bus bars 101, as shown in FIG. 4. Finally, the wires 102 are welded to remaining regions other than the regions of the positive electrode terminal 21 and the negative electrode terminal 4 of each of the lithium ion batteries 1 to which the bus bars 101 are connected by ultrasonic welding. Thus, the lithium ion battery connections 100 can be obtained.

Second Embodiment

The structure of a negative electrode terminal 204 for a lithium ion battery according to a second embodiment of the present invention is now described with reference to FIGS. 9 and 10. In this second embodiment, the brazing filler metal layer 41 provided as the bonding layer in the first embodiment is employed as the second metal layer in place of the Cu layer 42 provided as the second metal layer in the first embodiment in a terminal portion 240 of the negative electrode terminal 204, unlike in the aforementioned first embodiment. In other words, the second metal layer made of Cu or a Cu alloy of the negative electrode terminal according to the present invention is the brazing filler metal layer 41 made of brazing filler metal containing Cu. The negative electrode terminal 204 is an example of the "negative electrode terminal for a lithium ion battery" in the present invention.

Figure 9:
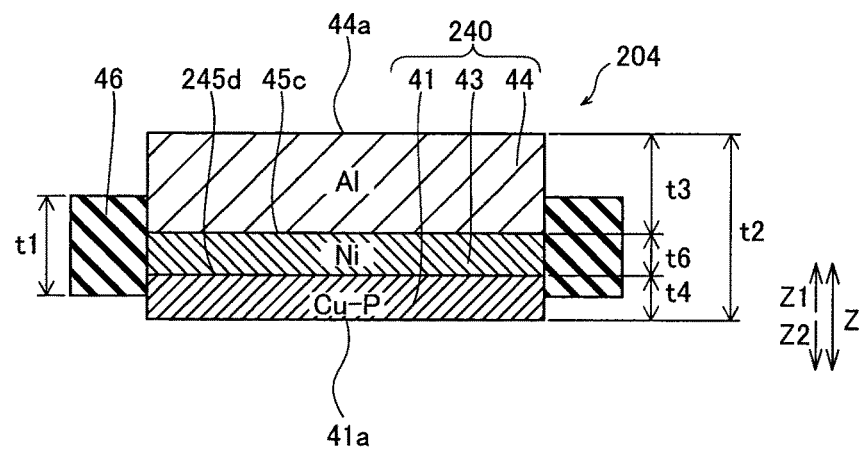
FIG. 9 is a sectional view showing a lithium ion battery including another exemplary negative electrode terminal different from the negative electrode terminal according to the present invention shown in FIG. 5, according to a second embodiment of the present invention.
Figure 10:
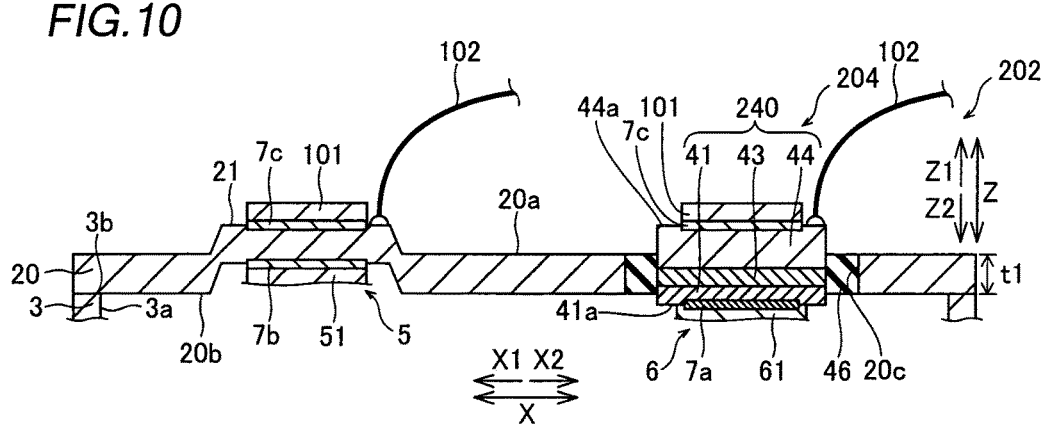
FIG. 10 is a sectional view showing the structure of the lithium ion battery employing the negative electrode terminal shown in FIG. 9, corresponding to the structure shown in FIG. 4.

The terminal portion 240 of the negative electrode terminal 204 according to the second embodiment of the present invention is made of a clad material having three layers of the brazing filler metal layer 41, the Ni layer 43, and the Al layer 44 stacked and bonded sequentially from below (Z2 side), as shown in FIGS. 9 and 10. The brazing filler metal layer 41 employed here is made of phosphor copper brazing filler metal (Cu—P) containing Cu and P of about 3 mass % identical to that employed in the first embodiment. This clad material is so configured that the single brazing filler metal layer 41 has the functions of the Cu layer 42 provided as the second metal layer and the brazing filler metal layer 41 provided as the bonding layer in the first embodiment. Thus, according to the second embodiment, the aforementioned structure of the negative electrode terminal 4 according to the first embodiment can be further simplified.

The aforementioned brazing filler metal layer 41 and Ni layer 43 are bonded (diffusion-bonded) to each other on an interface 245d (see FIG. 9). The Ni layer 43 stops diffusion of Al constituting the Al layer 44 and Cu constituting the negative electrode portion 6 and has a function of suppressing a reaction of Al with Cu. In the second embodiment of the present invention, the remaining structure other than the aforementioned matters is similar to that in the first embodiment, and hence the description is omitted.

A manufacturing process for the aforementioned negative electrode terminal 204 according to the second embodiment of the present invention is similar to that in the first embodiment except the manufacturing process for providing the Cu layer 42 in the negative electrode terminal 4 according to the first embodiment, and hence the description is omitted.

Third Embodiment

The structure of a negative electrode terminal 304 for a lithium ion battery according to a third embodiment of the present invention is now described with reference to FIGS. 11 and 12. In this third embodiment, a Ni layer 341 is employed as the bonding layer in place of the brazing filler metal layer 41 provided as the bonding layer in the first embodiment in a terminal portion 340 of the negative electrode terminal 304, unlike in the aforementioned first embodiment. The negative electrode terminal 304 is an example of the "negative electrode terminal for a lithium ion battery" in the present invention.

Figure 11:
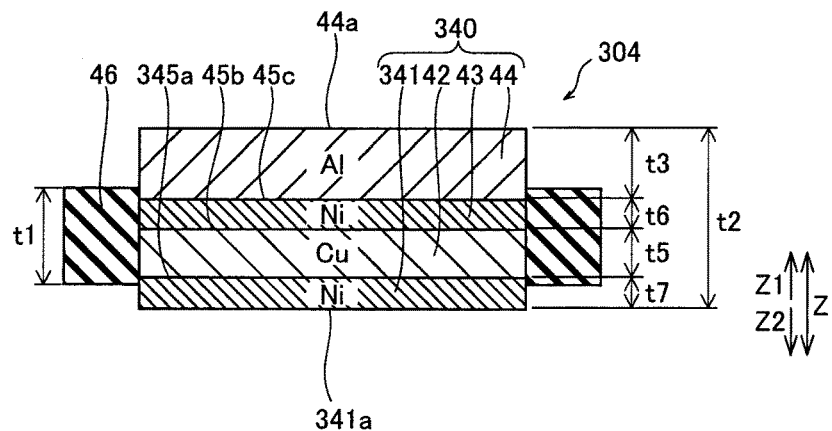
FIG. 11 is a sectional view showing a lithium ion battery including another exemplary negative electrode terminal different from the negative electrode terminals according to the present invention shown in FIGS. 5 and 9, according to a third embodiment of the present invention.

The terminal portion 340 of the negative electrode terminal 304 according to the third embodiment of the present invention is made of a clad material having four layers of the Ni layer 341, the Cu layer 42, the Ni layer 43, and the Al layer 44 stacked and bonded sequentially from below (Z2 side), as shown in FIG. 11. The Ni layer 341 and the Cu layer 42 are bonded (diffusion-bonded) to each other on a bonding interface 345a. The Ni layer 341 is made of Ni like the Ni layer 43 serving as the reaction-suppressing layer. The thickness t7 of the Ni layer 341 is smaller than the thickness t3 of the Al layer 44 and the thickness t5 of the Cu layer 42.

Figure 12:
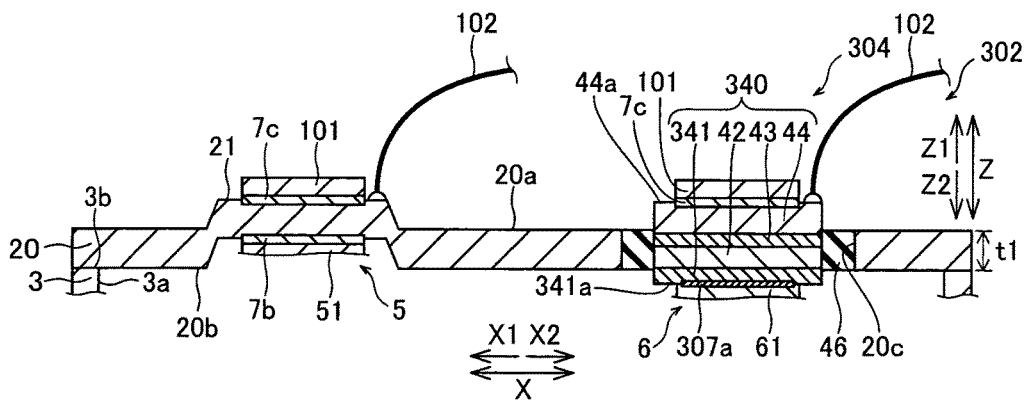
FIG. 12 is a sectional view showing the structure of the lithium ion battery employing the negative electrode terminal shown in FIG. 11, corresponding to the structure shown in FIG. 4.

As shown in FIG. 12, on the side of the lower surface 20b of the cover material 20, the Ni layer 341 of the terminal portion 340 of the negative electrode terminal 304 and the current collecting portion 61 of the negative electrode portion 6 are bonded to each other by resistance welding. Thus, a bonding portion 307a is formed in a region between the Ni layer 341 and the current collecting portion 61 corresponding to the welded region. This bonding portion 307a is a metal layer made of a Ni—Cu alloy formed by a reaction of Ni constituting the Ni layer 341 with Cu constituting the current collecting portion 61. In the third embodiment of the present invention, the remaining structure other than the aforementioned matters is similar to that in the first embodiment, and hence the description is omitted.

Manufacturing processes for the aforementioned negative electrode terminal 304 and a cover member 302 including this according to the third embodiment of the present invention are now described with reference to FIGS. 11 and 12.

First, a plate-like first Ni plate, a plate-like Cu plate, a plate-like second Ni plate, and a plate-like Al plate (not shown) are prepared. At this time, the thickness of the Al plate is rendered larger than the sum of the thickness of the first Ni plate, the thickness of the Cu plate, and the thickness of the second Ni plate. Furthermore, the thickness of the Cu plate is rendered larger than the sum of the thickness of the first Ni plate and the thickness of the second Ni plate. Then, the first Ni plate, the Cu plate, the second Ni plate, and the Al plate are sequentially stacked, and the same are bonded to each other by applying a prescribed pressure by a clad rolling machine, a press device, or the like. Thus, the clad material having four layers of the Ni layer 341, the Cu layer 42, the Ni layer 43, and the Al layer 44 stacked and bonded to each other can be formed. At this time, the Ni layer 341 and the Cu layer 42 are bonded (diffusion-bonded) on the bonding interface 345a. Furthermore, the thickness t7 of the Ni layer 341 is smaller than the sum of the thickness t3 of the Al layer 44 and the thickness t5 of the Cu layer 42. Then, the formed clad material of four layers is punched in a square shape having a prescribed size by pressing or the like, whereby the negative electrode terminal 304 (terminal portion 340) shown in FIG. 11 can be obtained.

Then, the cover member 302 provided with the positive electrode terminal 21 and the negative electrode terminal 304 is formed through the manufacturing process similar to that in the first embodiment, as shown in FIG. 12. On the side of the lower surface 20b of the cover material 20, a surface 341a of the Ni layer 341 of the negative electrode terminal 304 and the current collecting portion 61 of the negative electrode portion 6 are connected by resistance welding. At this time, sufficient heat (about 1100° C.) to melt the current collecting portion 61 is generated in a region between the Ni layer 341 and the current collecting portion 61 where contact resistance is large before bonding and on the side closer to the Ni layer 341 where electrical resistance is large. Thus, Cu of the melted current collecting portion 61 reacts with Ni of the Ni layer 341, and the Ni layer 341 of the negative electrode terminal 304 and the current collecting portion 61 are bonded to each other through the bonding portion 307a formed as the metal layer made of the Ni—Cu alloy. The remaining manufacturing process of the third embodiment of the present invention is similar to that of the first embodiment, and hence the description is omitted.

Fourth Embodiment

The structure of a negative electrode terminal 404 for a lithium ion battery according to a fourth embodiment of the present invention is now described with reference to FIGS. 13 to 15. In this fourth embodiment, no brazing filler metal layer 41 provided as the bonding layer in the first embodiment is provided in a terminal portion 440 of the negative electrode terminal 404, unlike in the aforementioned first embodiment. This negative electrode terminal 404 according to the fourth embodiment is the most basic structure of the negative electrode terminals according to the present invention, and materials for individual layers can be selected as necessary.

Figure 13:
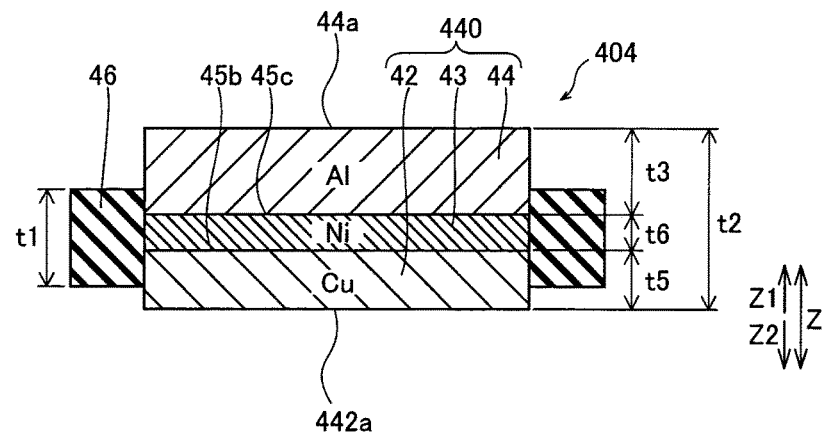
FIG. 13 is a sectional view showing a lithium ion battery including another exemplary negative electrode terminal different from the negative electrode terminals according to the present invention shown in FIGS. 5, 9, and 11, according to a fourth embodiment of the present invention.

The terminal portion 440 of the negative electrode terminal 404 according to the fourth embodiment of the present invention is made of a clad material having three layers of the Cu layer 42, the Ni layer 43, and the Al layer 44 stacked and bonded sequentially from below (Z2 side), as shown in FIG. 13. In other words, no brazing filler metal layer 41 is formed in the terminal portion 440 according to the fourth embodiment, unlike the aforementioned first embodiment.

Figure 14:
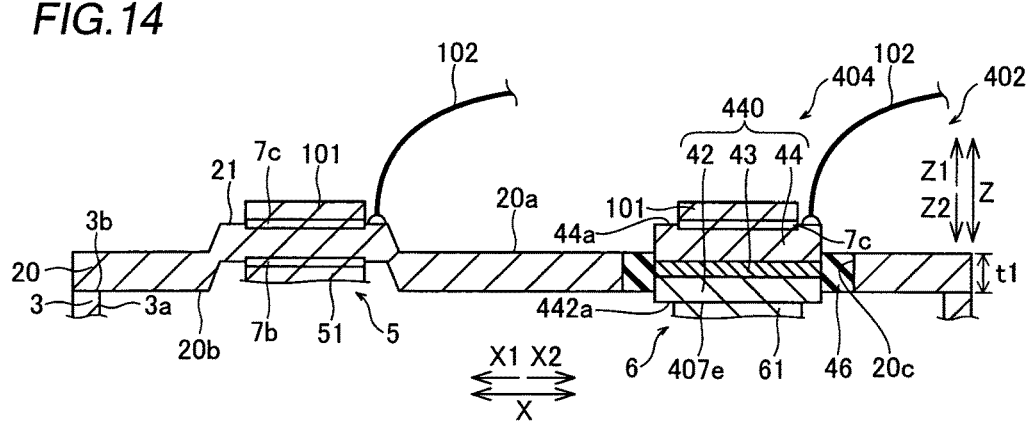
FIG. 14 is a sectional view showing the structure of the lithium ion battery employing the negative electrode terminal shown in FIG. 13, corresponding to the structure shown in FIG. 4.

As shown in FIG. 14, on the side of the lower surface 20b of the cover material 20, the Cu layer 42 of the terminal portion 440 of the negative electrode terminal 404 and the current collecting portion 61 of the negative electrode portion 6 are bonded to each other by laser beam welding. Thus, a bonding portion 407e is formed in a region between the Cu layer 42 and the current collecting portion 61 corresponding to the welded region. This bonding portion 407e is a metal layer made of Cu formed by melting the current collecting portion 61 in the welded region. The remaining structure according to the fourth embodiment of the present invention is similar to that according to the first embodiment, and hence the description is omitted.

Manufacturing processes for the aforementioned negative electrode terminal 404 and a cover member 402 including this according to the fourth embodiment of the present invention are now described with reference to FIGS. 13 to 15.

First, a plate-like Cu plate, a plate-like Ni plate, and a plate-like Al plate (not shown) are prepared. Then, the Cu plate, the Ni plate, and the Al plate are sequentially stacked, and the same are bonded to each other by applying a prescribed pressure by a clad rolling machine, a press device, or the like. Thus, the clad material having three layers of the Cu layer 42, the Ni layer 43, and the Al layer 44 stacked and bonded to each other is formed. Then, the formed clad material is punched in a square shape having a prescribed size by pressing or the like, whereby the negative electrode terminal 404 (terminal portion 440) shown in FIG. 13 can be obtained.

Figure 15:
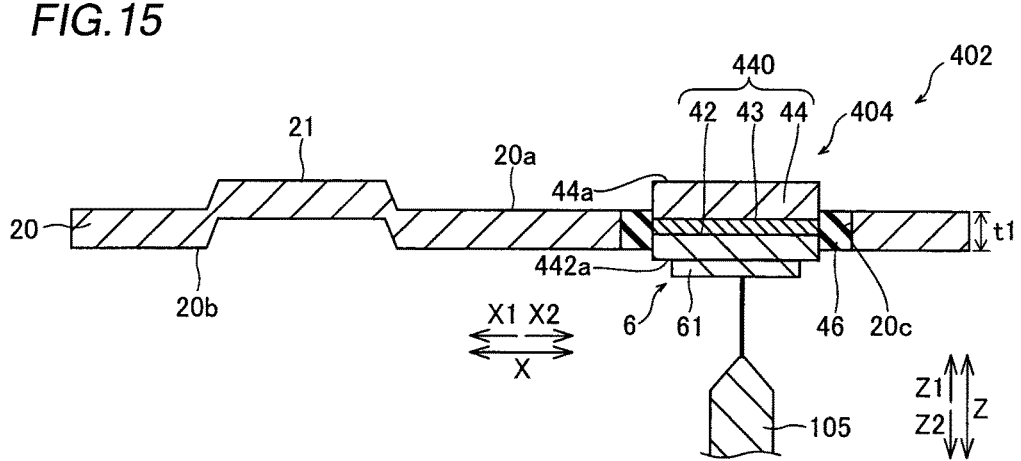
FIG. 15 is a sectional view for illustrating an exemplary manufacturing process for manufacturing the structure shown in FIG. 14.

Then, the cover member 402 provided with the positive electrode terminal 21 and the negative electrode terminal 404 is formed through the manufacturing process similar to that in the aforementioned first embodiment, as shown in FIG. 15. On the side of the lower surface 20b of the cover material 20, the Cu layer 42 of the negative electrode terminal 404 and the current collecting portion 61 of the negative electrode portion 6 are laser beam welded to each other by a laser welder 105. Specifically, while a surface 442a of the Cu layer 42 of the terminal portion 440 of the negative electrode terminal 404 and the current collecting portion 61 of the negative electrode portion 6 come into contact with each other, a laser beam is applied from below (Z2 side) by the laser welder 105. Thus, a portion of the current collecting portion 61 to which the laser beam is applied is melted, whereby the Cu layer 42 of the negative electrode terminal 404 and the current collecting portion 61 are bonded to each other through the bonding portion 407e formed as the metal layer made of Cu, as shown in FIG. 14. The remaining manufacturing process of the fourth embodiment of the present invention is similar to that of the first embodiment, and hence the description is omitted.

Fifth Embodiment

The structure of a lithium ion battery 501 and the structure of lithium ion battery connections 500 employing this according to a fifth embodiment of the present invention are now described with reference to FIGS. 3, 4, and 16. In this fifth embodiment, no positive electrode terminal protruding from the upper surface 20a is formed in a cover material 520 of a cover member 502 of the lithium ion battery 501, unlike in the aforementioned first embodiment. As a negative electrode terminal, the negative electrode terminal 4 according to the first embodiment is employed, and as the cover member, the cover member 2 is employed similarly. The lithium ion battery 501 is an example of the "lithium ion battery" in the present invention, and the cover member 502 is an example of the "cover member for a lithium ion battery" in the present invention.

Figure 16:
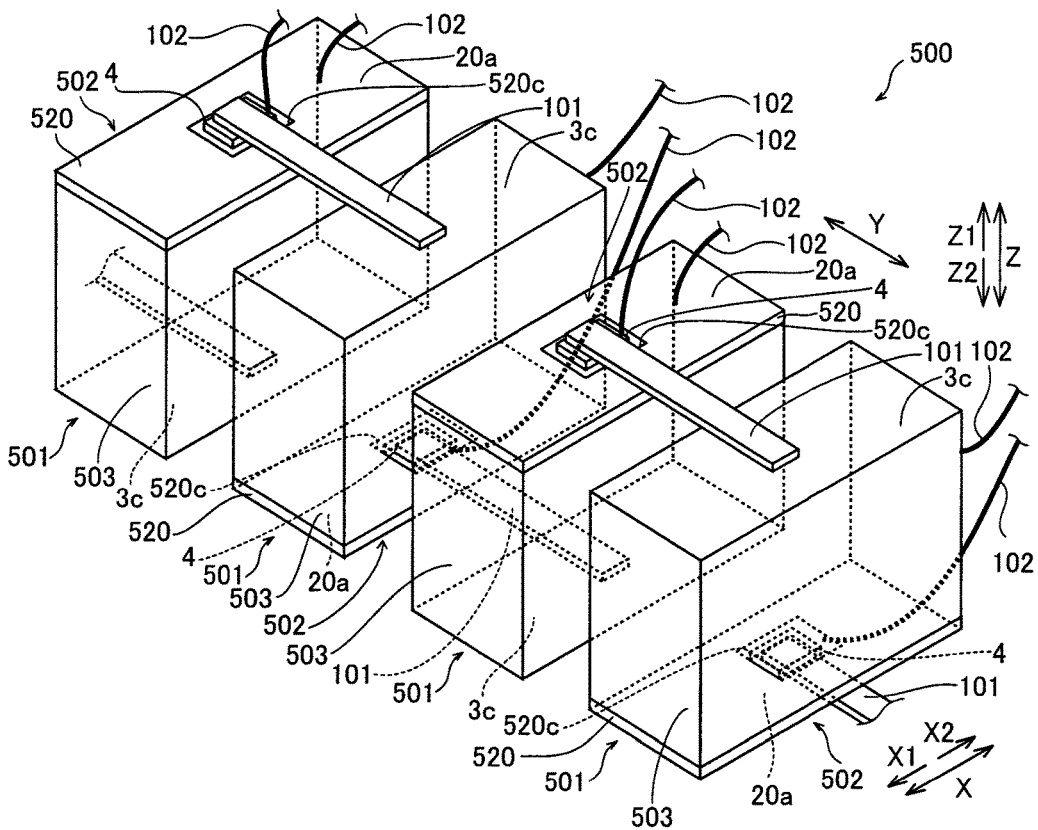
FIG. 16 is a perspective view showing other exemplary lithium ion batteries according to the present invention coupled by bus bars different from the structure shown in FIG. 1, according to a fifth embodiment of the present invention.

According to the fifth embodiment of the present invention, in the lithium ion battery 501 of the lithium ion battery connections 500, the cover member 502 has the cover material 520 provided with a hole 520c in a substantially central portion of the cover material 520 in a direction X and the negative electrode terminal 4 arranged in this hole 520c, as shown in FIG. 16. In other words, no positive electrode terminal protruding upward (to a Z1 side) from the upper surface 20a is formed in the cover material 520 of the cover member 502, unlike the first embodiment. On the other hand, the current collecting portion 51 (see FIG. 3) of the positive electrode portion 5 is connected to a battery case body 503 made of Al or the cover material 520 made of Al.

The lithium ion battery connections 500 have a plurality of lithium ion batteries 501 alternately arranged along a direction Y, and the plurality of lithium ion batteries 501 include a lithium ion battery 501 in which the cover member 502 is located on the upper side (Z1 side) and a lithium ion battery 501 in which the cover member 502 is located on the lower side (Z2 side). On one side in the direction Y, the negative electrode terminal 4 of a prescribed lithium ion battery 501 is welded (bonded) to one end in the direction Y of the bus bar 101 by resistance welding. Furthermore, on the other side in the direction Y, the other end in the direction Y of the bus bar 101 is welded to the bottom surface 3c of the battery case body 503 of another lithium ion battery 501 adjacent to the prescribed lithium ion battery 501 by resistance welding. Thus, the negative electrode terminal 4 of the prescribed lithium ion battery 501 is connected to the bottom surface 3c of the battery case body 503 of another adjacent lithium ion battery 501 through the bus bar 101.

In this manner, the lithium ion battery connections 500 having the plurality of lithium ion batteries 501 connected to each other in series are configured. The fifth embodiment is not restricted to the structure of welding the other side (the side of the positive electrode terminal) of the bus bar 101 to the bottom surface 3c of the battery case body 503, but the other side (the side of the positive electrode terminal) of the bus bar 101 may be welded to a side surface of the battery case body 503 or the cover material 520. Thus, the degree of freedom of a position to which the bus bar 101 is bonded can be improved, as compared with the structure of providing the positive electrode terminal 21 at a specified position (on the X1 side of the cover material 20) and welding the other side of the bus bar 101 at the position of the provided positive electrode terminal 21 as in each of the first to fourth embodiments. The remaining structure according to the fifth embodiment of the present invention is similar to that according to the first embodiment, and hence the description is omitted.

Manufacturing processes for the aforementioned lithium ion battery 501 and the lithium ion battery connections 500 employing this according to the fourth embodiment of the present invention are now described with reference to FIGS. 3 and 16.

First, an Al plate (not shown) made of Al is prepared. Then, the hole 520c passing through the Al plate in the thickness direction (direction Z) is formed in a substantially central portion of the Al plate in the direction X. Thus, the cover material 520 shown in FIG. 16 is formed. Then, the lithium ion battery 501 is manufactured through the manufacturing process similar to that in the first embodiment. At this time, the current collecting portion 51 (see FIG. 3) of the positive electrode portion 5 is welded to an arbitrary position of the battery case body 503 or the cover material 520.

Thereafter, the plurality of lithium ion batteries 501 are arranged along the direction Y such that the adjacent lithium ion battery 501 is turned upside down. Then, on the Z1 side of one side in the direction Y, the negative electrode terminal 4 of the prescribed lithium ion battery 501 and one end in the direction Y of the bus bar 101 are resistance welded to each other. On the other side in the direction Y, the bottom surface 3c of the battery case body 503 of the lithium ion battery 501 adjacent to the prescribed lithium ion battery 501 and the other end in the direction Y of the bus bar 101 are resistance welded to each other. Similarly, on the Z2 side, the bottom surface 3c of the battery case body 503 of the prescribed lithium ion battery 501 and the other end in the direction Y of the bus bar 101 are resistance welded to each other, and the negative electrode terminal 4 of a lithium ion battery 501 adjacent on one side in the direction Y and one end in the direction Y of the bus bar 101 are resistance welded to each other. In this manner, the lithium ion battery connections 500 shown in FIG. 16 can be obtained through the manufacturing process similar to that in the first embodiment.

Sixth Embodiment

The structure of a lithium ion battery 601 according to the sixth embodiment of the present invention is now described with reference to FIGS. 4 and 17. In this sixth embodiment, a cover material 620 of a cover member 602 and a battery case body 603 each are made of a Ni-plated steel sheet (Ni-plated Fe alloy), unlike in the aforementioned first embodiment. The lithium ion battery 601 is an example of the "lithium ion battery" in the present invention, and the cover member 602 is an example of the "cover member for a lithium ion battery" in the present invention.

Figure 17:
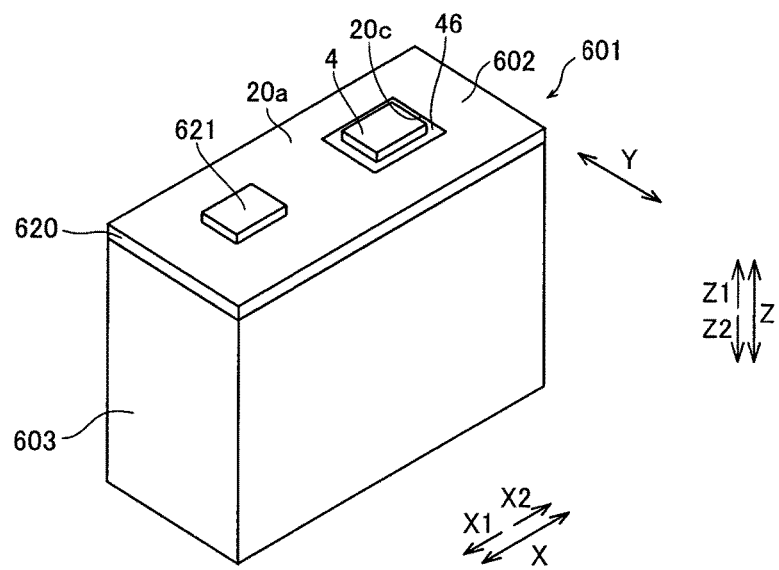
FIG. 17 is a perspective view showing another exemplary lithium ion battery different from the lithium ion battery shown in FIG. 2, according to a sixth embodiment of the present invention.

In the lithium ion battery 601 according to the sixth embodiment of the present invention, the cover material 620 of the cover member 602 and the battery case body 603 each are made of the Ni-plated steel sheet having mechanical strength and hardly deformed, as shown in FIG. 17. On the X1 side of the upper surface 20a of the cover material 620, a positive electrode terminal 621 made of an Al plate is welded. The remaining structure according to the sixth embodiment of the present invention is similar to that according to the first embodiment, and hence the description is omitted.

A manufacturing process for the aforementioned lithium ion battery 601 according to the sixth embodiment of the present invention is now described with reference to FIG. 17.

First, a plate made of the aforementioned Ni-plated steel sheet is prepared. Then, the positive electrode terminal 621 made of the Al plate is welded on the X1 side of the plate, and the hole 20c is formed on the X2 side of the plate. Thus, the cover material 620 is formed. The remaining manufacturing process of the sixth embodiment of the present invention is similar to that of the first embodiment except that the battery case body 603 made of the Ni-plated steel sheet is employed, and hence the description is omitted.

The examples of the present invention described above as the first to sixth embodiments merely illustrate the technical structure of the present invention in all points and should not be construed as limiting the scope of the invention. In other words, the scope of the present invention is shown not by the above description of the embodiments and examples but by the scope of claims for patent, and all modifications within the meaning and range equivalent to the scope of claims for patent are further included.

For example, while the example in which the Al layer 44 (first metal layer) of the negative electrode terminal 4 (204, 304, 404) is made of Al, the Cu layer 42 (second metal layer) is made of Cu, and the Ni layer 43 (reaction-suppressing layer) is made of Ni has been shown in each of the aforementioned embodiments, the present invention is not restricted to this. According to the present invention, the first metal layer of the negative electrode terminal may be made of an Al alloy such as an Al—Mn alloy, and the second metal layer of the negative electrode terminal may be made of a Cu-alloy such as a Cu—Ni alloy. Similarly, materials for the cover material, the battery case body, etc. are not restricted to those according to the aforementioned embodiments but can be properly selected as necessary.

While the example in which the insulating portion 46 has a thickness substantially equal to the thickness t1 (about 1 mm) of the cover material 20 (520, 620) has been shown in each of the aforementioned embodiments, the present invention is not restricted to this. According to the present invention, the thickness t1 of the insulating portion is not restricted particularly. In order to suppress contact of the terminal portion with the inner peripheral surface of the cover material, the thickness of the insulating portion is preferably equal to or more than the thickness t1 (about 1 mm) of the cover material. On the other hand, when the Al layer of the terminal portion and the bus bar are welded to each other and when the brazing filler metal layer (the Ni layer and the Cu layer) of the terminal portion and the current collector of the negative electrode portion are welded to each other, the thickness of the insulating portion is preferably equal to or less than the thickness t2 (about 2 mm) of the terminal portion in order to suppress contact of the cover material with the insulator.

While the example of welding the positive electrode terminal 621 made of the Al plate to the upper surface 20a of the cover material 620 made of the Ni-plated steel sheet has been shown in the aforementioned embodiment, the present invention is not restricted to this. According to the present invention, the positive electrode terminal 621 may be formed in the cover material 620 by plating Al on a prescribed position of the cover material 620 made of the Ni-plated steel sheet, or the positive electrode terminal 621 may be formed in the battery case body 603 by plating Al on a prescribed position of the battery case body 603. Furthermore, while the example in which both the cover material 620 and the battery case body 603 are made of the Ni-plated steel sheet (Ni-plated Fe alloy) has been shown, the present invention is not restricted to this. Both the cover material 620 and the battery case body 603 may be made of a Fe—Ni alloy, for example.

While the example in which the terminal portion 40 (240, 340, 440) of the negative electrode terminal 4 (204, 304, 404) has the thickness t2 of about 2 mm has been shown in each of the aforementioned embodiments, the present invention is not restricted to this. According to the present invention, the thickness t2 of the negative electrode terminal is not restricted particularly. The thickness t2 of the terminal portion of the negative electrode terminal is preferably at least about 1 mm and less than about 3 mm. In addition, the thickness t2 of the terminal portion is preferably equal to or more than the thickness t1 of the cover material in order to bond the negative electrode terminal and the bus bar to each other without bringing the cover material and the bus bar into contact with each other.

While the example in which the brazing filler metal layer 41 of the negative electrode terminal 4 is made of phosphor copper brazing filler metal (Cu—P) containing Cu and P of about 3 mass % has been shown in each of the aforementioned embodiments, the present invention is not restricted to this. According to the present invention, the brazing filler metal layer 41 of the negative electrode terminal 4 may be any as long as the same can bond the negative electrode terminal 4 and the current collecting portion 61 of the negative electrode portion 6 to each other. The brazing filler metal layer 41 of the negative electrode terminal 4 containing Cu is preferable since the electrical resistance is reduced and bonding between the same types of metal is enabled.

Specifically, Ag brazing filler metal (Ag—Cu—Zn alloy) or a Cu—Sn alloy may be employed as the brazing filler metal layer.

What is claimed is:

1. A negative electrode terminal for a lithium ion battery, made of a clad material comprising:
    a first metal layer made of Al or an Al alloy;
    a second metal layer made of Cu or a Cu alloy disposed under the first metal layer; and
    a reaction-suppressing layer interposed between the first metal layer and the second metal layer,
    wherein the reaction-suppressing layer suppresses a reaction between the first metal layer and the second metal layer, and
    wherein the first metal layer has a thickness larger than a sum of thicknesses of the second metal layer and the reaction-suppressing layer,
    the thickness of the first metal layer is uniform,
    the thickness of the second metal layer is uniform,
    the thickness of the reaction-suppressing layer is uniform, and
    the thicknesses are in a direction in which the first metal layer, the second metal layer, and the reaction-suppressing layer are stacked.

2. The negative electrode terminal for a lithium ion battery according to claim 1, wherein
    the reaction-suppressing layer is made of any of Ni or a Ni alloy and Ti or a Ti alloy.

3. The negative electrode terminal for a lithium ion battery according to claim 1, wherein
    the first metal layer and the second metal layer have flat surfaces.

4. The negative electrode terminal for a lithium ion battery according to claim 1, comprising a bonding layer on a negative electrode side of the second metal layer.

5. The negative electrode terminal for a lithium ion battery according to claim 4, wherein
    the bonding layer is made of any of brazing filler metal containing Cu, Ni or a Ni alloy, and Fe or a Fe alloy.

6. The negative electrode terminal for a lithium ion battery according to claim 1, wherein
    the second metal layer is made of brazing filler metal containing Cu.

7. The negative electrode terminal for a lithium ion battery according to claim 1, wherein
    the second metal layer has a thickness larger than a sum of thicknesses of layers excluding the first metal layer other than the second metal layer.

8. The negative electrode terminal for a lithium ion battery according to claim 1, having a bonding interface to which exposure prevention processing is applied.

9. A cover member for a lithium ion battery, comprising a negative electrode terminal for a lithium ion battery made of a clad material comprising:
    a first metal layer made of Al or an Al alloy;
    a second metal layer made of Cu or a Cu alloy disposed under the first metal layer; and
    a reaction-suppressing layer interposed between the first metal layer and the second metal layer,
    wherein the cover member has a cover member body made of a metal material provided with a hole,
    wherein the reaction-suppressing layer suppresses a reaction between the first metal layer and the second metal layer, and
    wherein the negative electrode terminal is supported in an electrically insulated state in the hole, and wherein the first metal layer has a thickness larger than a sum of thicknesses of the second metal layer and the reaction-suppressing layer,
the thickness of the first metal layer is uniform,
the thickness of the second metal layer is uniform,
the thickness of the reaction-suppressing layer is uniform, and
the thicknesses are in a direction in which the first metal layer, the second metal layer, and the reaction-suppressing layer are stacked.

10. The cover member for a lithium ion battery according to claim 9, wherein
the negative electrode terminal is supported in the hole while protruding from a surface of the cover member body.

11. A lithium ion battery employing a cover member for the lithium ion battery comprising
a negative electrode terminal for a lithium ion battery made of a clad material comprising:
a first metal layer made of Al or an Al alloy
a second metal layer made of Cu or a Cu alloy disposed under the first metal layer; and
a reaction-suppressing layer interposed between the first metal layer and the second metal layer,
the lithium ion battery comprising a housing member housing at least a negative electrode portion made of Cu or a Cu alloy, a positive electrode portion made of Al or an Al alloy, and an electrolyte,
wherein the cover member has a cover member body made of a metal material provided with a hole in which the negative electrode terminal is supported in an electrically insulated state,
wherein the reaction-suppressing layer suppresses a reaction between the first metal layer and the second metal layer,
wherein the first metal layer has a thickness larger than a sum of thicknesses of the second metal layer and the reaction-suppressing layer,
the thickness of the first metal layer is uniform,
the thickness of the second metal layer is uniform,
the thickness of the reaction-suppressing layer is uniform, and
the thicknesses are in a direction in which the first metal layer, the second metal layer, and the reaction-suppressing layer are stacked, and
wherein the housing member is hermetically sealed by the cover member, and the negative electrode portion is connected with the negative electrode terminal.

12. The lithium ion battery according to claim 11, wherein positive electrode sides of a plurality of lithium ion batteries are electrically connected to the negative electrode terminal in series by a bus bar made of Al or an Al alloy.

* * * * *